3,752,807
PROCESS FOR THE PREPARATION OF NOVEL ORALLY EFFECTIVE CARDIO-ACTIVE CARDENOLIDES
Johannes Hermann Hartenstein, Wittental, and Gerhard Satzinger, Gundelfingen, Germany, assignors to Warner-Lambert Company, Morris Plains, N.J.
No Drawing. Filed Feb. 9, 1972, Ser. No. 224,960
Claims priority, application Germany, Feb. 11, 1971, P 21 06 386.5
Int. Cl. C07c 173/00
U.S. Cl. 260—239.57    12 Claims

ABSTRACT OF THE DISCLOSURE

The present application relates to compounds of the General Formula I

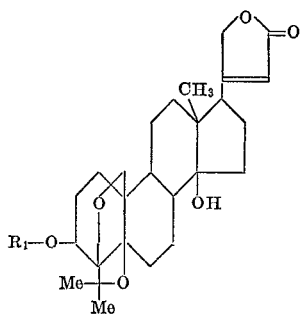

wherein $R_1$ means hydrogen, an alkyl, alkoxyalkyl, acyl, aroyl, a tetrahydropyranosyl, or a glycosyl residue, the latter two being substituted if desired. These compounds when taken orally produce a cardiotonic effect.

---

The present invention relates to a process for the preparation of the above compounds, marked by the fact that compounds of the General Formula II

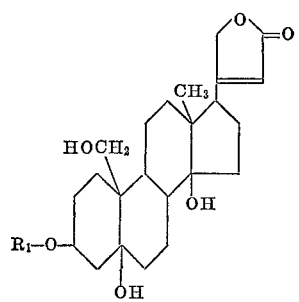

wherein $R_1$ has the above meaning are reacted with an excess of 2,2-dimethoxypropane in an inert organic solvent in the presence of an acid acting as a catalyst, preferably of p-toluenesulfonic acid, at temperatures between 0 and +75° C., preferably at room temperature, and, if desired—provided that the residue $R_1$ has suitable functional groups—are subsequently alkylated or acylated according to previously known methods or—if the residue $R_1$ is provided with such groups—the acetate groups are saponified with methanolic ammonia.

In the therapy of cardiac insufficiency the naturally occuring cardiac glycosides hold a central position. Fully synthetic drugs which could have been substituted for the classic cardiac glycosides have not been found so far. Among the available natural cardiac glycosides the orally effective glycosides of the digitalis type tending, however, to cumulate are confronted with the glycosides of the strophanthin type which are parenterally effective only but have a rapid onset of action and a high subsidence rate. From the view of physicians, an "oral" strophanthin, owing to its easy controllability would be absolutely preferable to the digitalis preparations. Accordingly, the present invention resulted from the search for novel, orally effective cardiotonics of the strophanthin type.

The reaction according to the invention, which is novel for steroid chemistry, takes place rapidly and in many cases almost quantitively. Generally it is completed after 1 to 5 minutes as shown by TLC analysis. Suitable solvents are lower alcohols, such as abs. methanol or ethanol, in particular, however, aprotic solvents, such as acetone, dioxane, tetrahydrofuran, or dimethylformamide.

As catalysts of the reaction acids are used, such as p-toluenesulfonic acid, 70% perchloric acid, or ethereal hydrochloric acid gas, in particular. In this connection the concentration thereby is to be such that elimination of the hydroxyl group attached to C–14 and/or a splitting off of an acid-sensitive $R_1$ residue which may be present, especially of a 2'-desoxyglycosyl residue, are avoided.

Preference is given to a concentration of 0.1 to 5% of p-toluenesulfonic acid, based on the steroid used.

Indeed it has been known from literature on the subject that 1,2- and 1,3-glycols can react with ketones, forming dioxolane or dioxane rings. Likewise preparation of such compounds by means of trans-ketalization of suitable ketals has been known. Tertiary hydroxyl groups, however, tend to form ketals to a lower degree only, since ketal formation is rather substantially dependent upon steric and conformational factors. (Cf. on this subject e.g. E. Schmitz and I. Eichhorn in S. Patai, Ed., The Chemistry of the Ether Linkage, p. 309 ff., Interscience, London 1967.) The smooth formation of the compounds according to the invention which are obtained by participation in the ketalization of the tertiary hydroxyl group attached to the C–5 bridgehead atom must, therefore, be deemed surprising.

The compounds of the General Formula II used for the reaction according to the invention are obtained from the corresponding 10-formyl compounds by reduction by means of complex metal hydrides, such as sodium borohydride or lithium-tri-tert. butoxy-aluminum hydride, in an inert organic solvent, according to methods described in literature [cf. e.g. A. Hunger, T. Reichstein, Chem. Ber. 85, 635 (1952)].

Practically all corresponding 5β-hydroxy-cardenolides enter into consideration as 10-formyl compounds, such as strophanthidin, 3-O-acetyl-, 3-O-methyl-strophanthidin, 2 - tetrahydropyranosyl-strophthidin, naturally occuring glycosides—e.g. cymarine, convallatoxin, helveticoside, k-strophanthidin, strophanthidin-β-D-glucoside and synthetic strophanthidin glycosides. The hydroxyl groups of the glycose moieties may be alkylated, acylated, or acetalized, if desired.

Preparation of the starting substances used in the process according to the invention may partly be effected according to patent specifications, e.g. that of helveticosol according to DBP 1.114.188, 4'-monoester of cymarol according to DBP 1.276.035, acyl derivatives of helveticosol according to BP 1113027, ether derivatives of helveticosol according to DOS 1568222 and 1568216, convallatoxol derivatives according to the German patent application P 2042 646; partly it has been known from scientific literature (cf. e.g. A. Hunger, T. Reichstein l. c.). Processing of the reaction mixture is performed by neutralization of the catalyst, concentration under vacuum, and extraction with an organic solvent, such as chloroform. The product is isolated directly by crystallization or after chromatography on silica gel.

If hydroxyl groups capable of forming ketals are at the same time present in the residue $R_1$ of the General Formula II, as is the case e.g. with convallatoxol or helveticosol, the corresponding bisacetonides are obtained in the process according to the invention.

In those cases where the hydroxyl groups of the residue $R_1$ of the Formula I, protected by acetylation, are to be freed again, the product may by saponification with methanolic ammonia or potassium bicarbonate in methanol be transformed subsequently into the corresponding hydroxyl compound. On the other hand, the compounds of the Formula I prepared according to the invention may provided that they have suitable functional groups, if desired, be subsequently alkylated or subjected to other chemical operations as far as those leave intact the isopropylidenedioxy bridge prone to hydrolysis.

Contrary to the starting substances exhibiting their full cardiotonic effect upon intravenous application only, the compounds obtained according to the above process of the invention distinguish themselves by an enteric activity which is extraordinarily high in some cases.

The following table exemplarily shows for some substances of the invention the values obtained according to R. A. Hatcher et al., Am. J. Pharm. 82, 360 (1910), from the intravenous lethal dose in cats as well as their enteral absorption rates resulting from the following ratio:

absorption rate in percent $$= \frac{\text{(Hatcher dose)} - \text{fill-up dose}}{\text{dose administered intraduodenally}} \cdot 100$$

TABLE I.—ENTERAL ABSORPTION RATES OF SOME CARDENOLIDE DERIVATIVES IN CATS

| Substance/example number | $LD_{100}$ (mg./kg.) | Absorption rate (percent) |
| --- | --- | --- |
| Cymarol/— | 0.187 | 22 |
| Cymarol acetonide/1 | 0.583 | 293 |
| Diacetyl helveticosol acetonide/6 | 0.933 | 80 |
| Helveticosol bisacetonide/5 | 0.835 | 49 |
| Convallatoxin/— | 0.139 | 0 |
| Convallatoxin bisacetonide/3 | 0.490 | 50 |

The enteral absorption rate of cymarol acetonide shows for instance that the compound when administered enterally is about three times as effective as in intravenous application. This corresponds to the degree of efficacy of cymarol with an assumed 100% enteral absorption rate. Thus, the compounds according to the invention can be used as "oral" strophanthins for the therapy of cardiac insufficiency, offering all advantages of an oral application. It is very surprising that from the chemical modification according to the invention of the basic cardenolides such as increase—which is partly dramatic—of the enteral cardiotonic activity should result, since the genin—to which the pharmacological activity is due responds by a decrease or even loss of activity already to minor alterations of the stereochemical structure, as is known (cf. e.g. K. Greef, "Probleme der klinischen Prüfung herzwirksamer Glykosida," Dr. D. Steinkopff Verlag, Darmstadt, 1968). Owing to the ideas so far developed concerning the mode of action of cardiac glycosides it was to be expected that the bulky isopropylidenedioxy bridge between C–5 and C–19 exerts an unfavorable influence upon the glycoside-enzyme interaction.

The following examples serve to illustrate the invention, but they are not intended to limit it thereto.

EXAMPLE 1

Cymarol-5,19-acetonide 380 mg. cymarol are freed of water by repeated evaporation of a benzene solution and then mixed with 10 ml. of anhydrous acetone, 5 ml. of 2,2-dimethoxypropane and 20 mg. of p-toluenesulfonic acid. The solution is allowed to stand at room temperature for 10 minutes, then neutralized with 5% sodium bicarbonate, concentrated in vacuum, and extracted with chloroform. After drying and evaporation of the solvent in vacuum, the residue is crystallized from methanol/ether. Yield: 230 mg. (78% of theory) of colorless crystals, M.P. 204–211° C.

$C_{33}H_{50}O_9 \cdot H_2O$.—Calculated (percent): C, 65.11; H, 8.61; O, 26.28. Found (percent): C, 65.50; H, 8.47; O, 26.10.

EXAMPLE 2

4′-O-acetyl-cymarol-5,19-acetonide 370 mg. of 4′-O-acetyl-cymarol are reacted with 5 ml. of 2,2-dimethoxypropane in 10 ml. of acetone and 20 mg. of p-toluenesulfonic acid at room temperature. After 10 minutes the mixture is processed as described in Example 1. A total of 337 mg. (95% of theory) of colorless crystals, M.P. 189–200° C. is obtained from methanol/water.

$C_{35}H_{52}O_{10}$.—Calculated (percent): C, 66.43; H, 8.28; O, 25.29. Found (percent): C, 66.56; H, 8.28; O, 25.07.

EXAMPLE 3

2′,3′-O-isopropylidene-convallatoxol-5,19-acetonide 200 mg. of convallatoxol [prepared according to A. Hunger, T. Reichstein, Chem. Ber. 85, 635 (1952)] are reacted with 3 ml. of 2,2-dimethoxypropane and 10 mg. of p-toluenesulfonic acid in 5 ml. of dry acetone. The reaction mixture is processed as described in Example 1. Chromatography of the residue on silica gel yields 175 mg. of product as white foam.

132 mg. (58% of theory) of product are obtained by reprecipitating from acetic ester/ether as an amorphous white powder, M.P. 160–162° C.

$C_{35}H_{52}O_{10} \cdot \tfrac{1}{2} H_2O$.—Calculated (percent): C, 65.50; H, 8.32; O, 26.18. Found (percent): C, 65.46; H, 8.06; O, 26.22.

EXAMPLE 4

2′,3′,4′-O-triacetyl-convallatoxol-5,19-acetonide 443 mg. of convallatoxol triacetate in 5 ml. of acetone are mixed with 5 ml. of 2,2-dimethoxypropane and 15 mg. of p-toluenesulfonic acid. The mixture is heated to 35° C. for 15 minutes, then processed as described in Example 1. Crystallizing the crude product from methanol yields 166 mg. of product. Chromatography of the mother liquor on silica gel and crystallization from methanol yields another 73 mg. of product.

Total yield: 51% of theory.

The analytical sample melts at 269–271° C. with decomposition.

$C_{38}H_{54}O_{13}$.—Calculated (percent): C, 63.50; H, 7.57; O, 28.94. Found (percent): C, 63.51; H, 7.30; O, 29.18.

EXAMPLE 5

3′,4′-O-isopropylidene-helveticosol-5,19-acetonide 328 mg. of helveticosol in 5 ml. of acetone are mixed with 3 ml. of 2,2-dimethoxypropane and 20 mg. of p-toluenesulfonic acid. Processing as described in Example 1 and chromatography on silica gel yields 173 mg. of product as white foam. Reprecipitation from ether/hexane yields 122 mg. (33% of theory) of product as white amorphous powder, M.P. 170–172° C.

$C_{35}H_{52}O_9$.—Calculated (percent): C, 68.15; H, 8.50; O, 23.35. Found (percent): C, 68.30; H, 8.60; O, 23.60.

EXAMPLE 6

3′,4′-O-bisacetyl-helveticosol-5,19-acetonide 128 mg. of 3′,4′-O-bisacetyl-helveticosol in 3 ml. of acetone are mixed with 3 ml. of 2,2-dimethoxypropane and 15 mg. of p-toluenesulfonic acid and allowed to stand at room temperature for 5 minutes. Processing as in Example 1 and crystallization from ethyl acetate/ether yields 76 mg. (56% of theory) of crystalline product, M.P. 238–240° C.

$C_{36}H_{52}O_{11}$.—Calculated (percent): C, 65.44; H, 7.93; O, 26.64. Found (percent): C, 65.26; H, 8.09; O, 26.45.

EXAMPLE 7

Helveticosol-5,19-acetonide 394 mg. of 3′,4′-O-bisacetyl-helveticosol-5,19-acetonide (Example 5, crude product, homogenous in TLC) are dissolved in 25 ml. of methanol and mixed with 5 ml. of saturated methanolic ammonia solution. The mixture is allowed to stand at room temperature overnight, the solvent is then distilled off in vacuum, the product mixed with water and extracted with chloroform/methanol 8:2. Drying and evaporation in vacuum yields 356 mg. of colorless foam. From ethyl acetate/hexane 184 mg. (41% of theory) of product as white, amorphous powder, M.P. 160–165° C., is obtained.

$C_{32}H_{48}O_9$.—Calculated (percent): C, 66.64; H, 8.39; O, 24.97. Found (percent): C, 66.46; H, 8.45; O, 25.11.

EXAMPLE 8

3-O-acetyl-strophanthidol-5,19-acetonide 493 mg. of 3-O-acetyl-strophanthidol, M.P. 217–221° C., prepared by sodium boro hydride reduction of 3-O-acetyl-strophanthidin, are reacted with 5 ml. of 2,2-dimethoxypropane and 25 mg. of p-toluenesulfonic acid in 5 ml. of acetone. Following 1 hour standing at room temperature, processing as described in Example 1 and crystallization from methanol/water yields 326 mg. (61% of theory) of product, M.P. 269–272° C./278–280° C.

$C_{28}H_{40}O_7$.—Calculated (percent): C, 68.83; H, 8.25; O, 22.92. Found (percent): C, 68.85; H, 8.27; O, 22.76.

EXAMPLE 9

Strophanthidol-5,19-acetonide 390 mg. of strophanthidol in 5 ml. of acetone are mixed with 5 ml. of 2,2-dimethoxypropane and 20 mg. of p-toluenesulfonic acid. Following 5 minutes standing at room temperature, processing as described in Example 1, chromatography on silica gel, and crystallization from methanol/ether yields 232 mg. (55% of theory) of product, M.P. 220–225° C.

$C_{26}H_{38}O_6 \cdot \frac{1}{2}CH_3OH$.—Calculated (percent): C, 68.81; C, 8.72; O, 22.48. Found (percent): C, 69.06; H, 8.29; O, 22.64.

What we claim is:

1. A compound of Formula I wherein $R_1$ is hydrogen, a digitoxosyl of Formula A

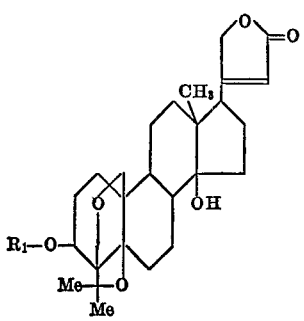

(I)

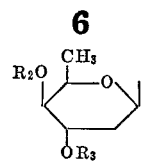

(A)

in which $R_2$ and $R_3$ are hydrogen, methyl, lower alkanoyl having 1–4 carbon atoms or $R_1$ is a rhamnosyl of the Formula B

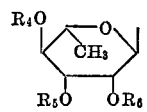

(B)

in which $R_4$, $R_5$ and $R_6$ are hydrogen or when $R_4$ is hydrogen and $R_5$ and $R_6$ taken together form isopropylidene or secondary butylidene residue.

2. Cymarol-5,19-acetonide.
3. 4′-O-acetyl-cymarol-5,19-acetonide.
4. 2′,3′-O-isopropylidene-convallatoxol-5,19-acetonide.
5. 2′,3′,4′-O-triacetyl-convallatoxol-5,19-acetonide.
6. 3′,4′-O-isopropylidene-helveticosol-5,19-acetonide.
7. 3′,4′-O-bisacetyl-helveticosol-5,19-acetonide.
8. Helveticosol-5,19-acetonide.
9. 3-O-acetyl-strophanthidol-5,19-acetonide.
10. Strophanthidol-5,19-acetonide.
11. A process for the preparation of the compounds as set forth in claim 1, which comprises reacting compounds of the Formula II

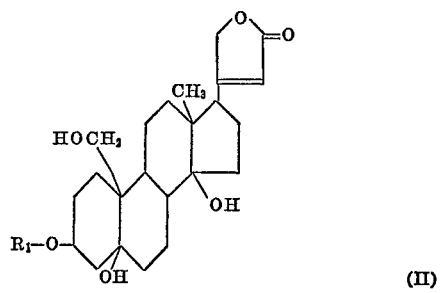

(II)

wherein $R_1$ has the same meaning as defined with an excess of 2,2-dimethoxypropane in an inert organic solvent in the presence of p-toluenesulfonic acid, perchloric acid, or hydrogen chloride.

12. The process according to claim 11, wherein the reaction is effected in the presence of p-toluenesulfonic acid.

References Cited

UNITED STATES PATENTS 3,560,486    2/1971    Marx et al. _____ 260—239.55

HENRY A. FRENCH, Primary Examiner

U.S. Cl. X.R.

260—210.5; 424—241